(12) United States Patent
Peters et al.

(10) Patent No.: US 6,259,471 B1
(45) Date of Patent: *Jul. 10, 2001

(54) APPARATUS AND SERVICE FOR TRANSMITTING VIDEO DATA

(75) Inventors: Wolfgang Peters, Tamm; Gerhard Schneider, Grafenau, both of (DE)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/815,196

(22) Filed: Mar. 11, 1997

(30) Foreign Application Priority Data

Mar. 14, 1996 (DE) ................................ 196 10 010

(51) Int. Cl.[7] .................................................... H04N 7/173
(52) U.S. Cl. .............................. 348/17; 348/13; 348/14; 348/10; 348/7; 455/4.2; 455/5.1; 395/200.49
(58) Field of Search .................... 348/13, 12, 7, 348/6, 10, 17, 14, 552; 455/4.2, 5.1, 6.1, 6.2, 6.3; 34/7; 395/200.49, 200.47, 200.48; 379/102.02, 102.03, 100.17; 370/264, 270, 904; H04N 7/173, 7/15

(56) References Cited

U.S. PATENT DOCUMENTS

| | | | |
|---|---|---|---|
| 5,247,347 | * 9/1993 | Litteral et al. | 358/85 |
| 5,260,783 | * 11/1993 | Dixit | 358/136 |
| 5,363,139 | * 11/1994 | Keith | 348/415 |
| 5,365,265 | * 11/1994 | Shibata et al. | 348/15 |
| 5,371,532 | * 12/1994 | Gelman et al. | 348/7 |
| 5,371,534 | * 12/1994 | Dagdeviren et al. | 348/14 |
| 5,512,938 | * 4/1996 | Ohno | 348/15 |
| 5,528,281 | * 6/1996 | Grady et al. | 348/7 |
| 5,541,982 | * 7/1996 | Bergler | 379/93.06 |
| 5,585,839 | * 12/1996 | Ishida et al. | 348/15 |
| 5,587,735 | * 12/1996 | Ishida et al. | 348/14 |
| 5,594,736 | * 1/1997 | Tatsumi et al. | 370/474 |
| 5,604,738 | * 2/1997 | Shibata et al. | 370/264 |
| 5,611,038 | * 3/1997 | Shaw et al. | 345/302 |
| 5,617,135 | * 4/1997 | Noda et al. | 348/12 |
| 5,625,404 | * 4/1997 | Grady et al. | 348/7 |
| 5,742,729 | * 4/1998 | Ema et al. | 386/68 |
| 5,768,539 | * 6/1998 | Metz et al. | 348/7 |
| 5,774,483 | * 6/1998 | Hwang | 371/62 |
| 5,793,415 | * 8/1998 | Gregory, III et al. | 348/15 |
| 5,812,778 | * 9/1998 | Peters et al. | 395/200.49 |
| 5,835,538 | * 11/1998 | Townshend | 375/295 |
| 5,877,821 | * 3/1999 | Newlin et al. | 348/724 |
| 5,894,504 | * 4/1999 | Alfred et al. | 379/88.13 |
| 5,905,940 | * 5/1999 | Arvisais | 455/2 |
| 5,956,729 | * 9/1999 | Goetz et al. | 707/104 |

FOREIGN PATENT DOCUMENTS

| | | |
|---|---|---|
| 0498649 | 8/1992 | (EP) . |
| 0658035 | 6/1995 | (EP) . |
| 0676898 | 10/1995 | (EP) . |
| 0696127 | 2/1996 | (EP) . |

* cited by examiner

*Primary Examiner*—Reinhard J. Eisenzopf
*Assistant Examiner*—Jean W. Désir
(74) *Attorney, Agent, or Firm*—Ware, Fressola, Van Der Sluys & Adolphson LLP

(57) ABSTRACT

An apparatus for transmitting video data over an integrated services digital network. The apparatus comprises a video/audio receiving unit, a transmitting unit for transmitting video data over a switched connection to the video/audio receiving unit, a receiving unit for receiving request signals from the video/audio receiving unit, an encoding unit for encoding the video data using at least two different encoding methods, and a control unit cooperatively engaged with the encoding unit, wherein the encoding methods are selectable in accordance with the request made by a subscriber to select the type of encoding method and the time of encoding.

1 Claim, 2 Drawing Sheets

APPARATUS AND SERVICE FOR TRANSMITTING VIDEO DATA

TECHNICAL FIELD

The invention relates to an apparatus for transmitting video data into an integrated services digital network (NET). It is also directed to an apparatus for transmitting request signals into an integrated services digital network (NET). It is still further directed to a service for transmitting video data via an integrated services digital network.

BACKGROUND OF THE INVENTION

From the not yet published patent application P 1 95 24 704.3, there is known a service for transmitting video data of a video movie via a integrated services digital network. In a video server, there are stored several video movies, which are first selected from video telephones via request signals and subsequently transmitted to the respective video telephones via a switched connection. The encoding of the video data of the video movies is prearranged. The service is restricted to downloading of video movies in the form of a sequence of video images.

SUMMARY OF THE INVENTION

Therefore, it is an object of the invention to transmit video data in a more flexible manner.

This object is solved by an apparatus for transmitting video data into an integrated services digital network, said apparatus comprising a transmitting unit for transmitting the video data over a switched connection, a receiving unit for receiving request signals, an encoding unit for encoding the video data using at least two different encoding methods, and a control unit with which the encoding method is selectable in accordance with information in the received request signals.

This object is also solved by an apparatus for transmitting request signals into an integrated services digital network, said apparatus comprising a transmitting unit for transmitting the request signals over a switched connection, a receiving unit for receiving video data, a decoding unit for decoding the received video data by at least two different decoding methods, and a control unit for detecting the method by which the received video data were encoded and for selecting the decoding method in the decoding unit.

The above object is still further solved by a service for transmitting video data via an integrated services digital network, wherein the video data to be transmitted are requested by request signals, wherein the requested video data are transmitted over a switched connection and wherein the encoding method used for transmitting the requested video data is selected from at least two different encoding methods through request signals.

It is a particular advantage of the invention that received and stored still images can be processed later, e.g. the images can be printed by facsimile equipment or transmitted to a video telephone.

BRIEF DESCRIPTION OF THE DRAWINGS

It is another advantage of the invention that in the event that the transmission quality changes, encoding methods with different resolution can be selected via the request signals.

The invention is discussed hereinafter with respect to two embodiments and with reference to the FIGS. 1 and 2. It is shown in.

BEST MODE FOR CARRYING OUT THE INVENTION

The first embodiment will now be described with reference to FIG. 1.

Figure 1:
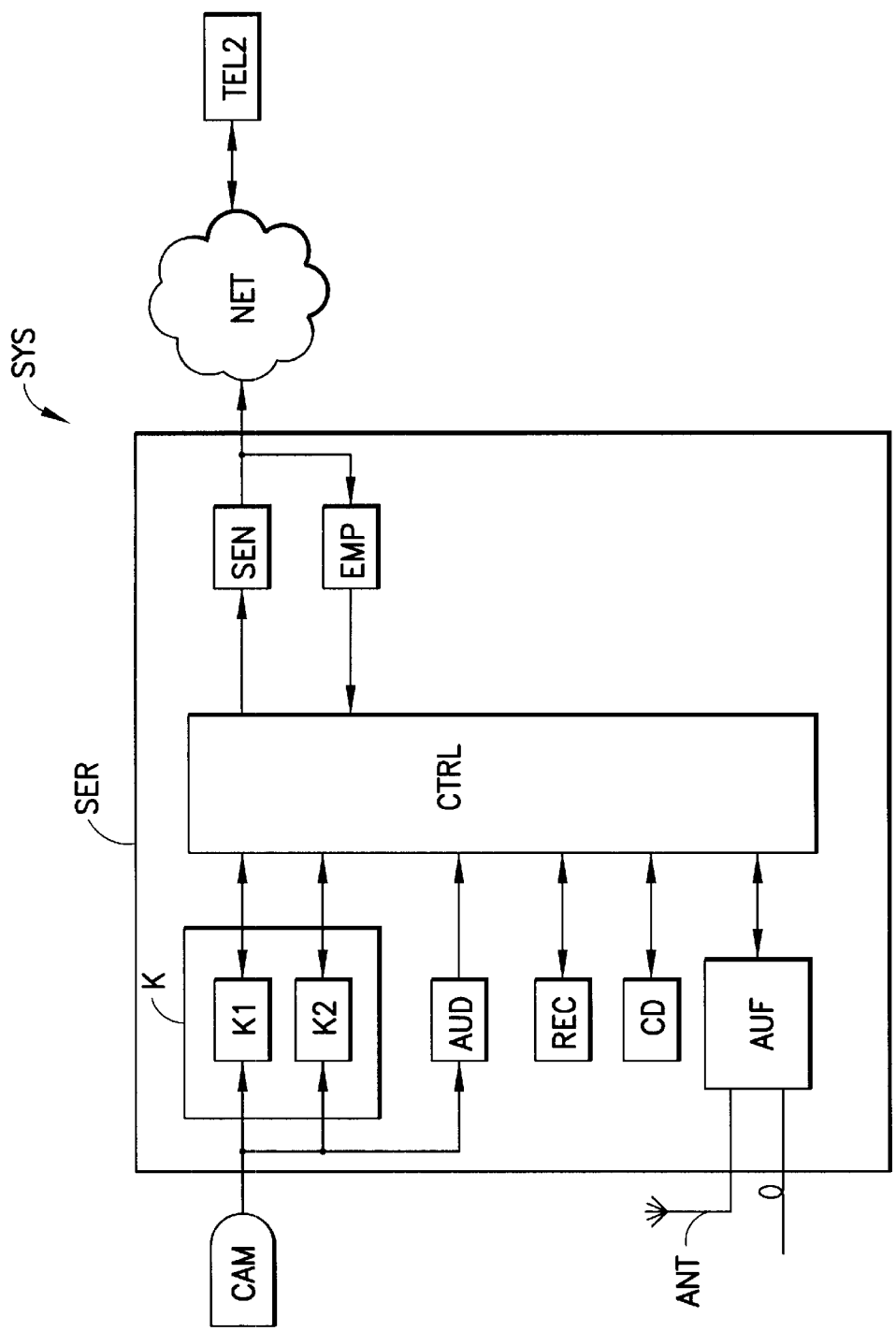
FIG. 1 a schematic representation of a first embodiment of a transmission system according to the invention, and FIG. 2 a schematic representation of a second embodiment of a transmission system according to the invention.

FIG. 1 shows a transmission system SYS according to the invention. The transmission system SYS comprises an apparatus for transmitting video data, the apparatus in the form of a server SER and connected via an integrated services digital network NET, also called ISDN, to an apparatus for transmitting request signals in the form of a video telephone TEL2.

A switched connection is established from the video telephone TEL2 to the server SER by dialing the server SER. Through request signals transmitted from the video telephone TEL2 to the server SER over the switched connection, video data stored in the server and/or an associated encoding method are selected. The selected video data are transmitted in real time from the server SER to the video telephone TEL2 over the switched connection.

The server SER comprises a transmitting unit SEN, a receiving unit EMP, an encoding unit K and a control unit CTRL. The transmitting unit SEN is used to transmit selected video data into the integrated services digital network NET over a switched connection. The transmitting unit SEN comprises a unit for 2-wire-4-wire conversion and an amplifier.

The receiving unit EMP is used to receive request signals from the integrated services digital network NET. The receiving unit EMP comprises a real time 2-wire-4-wire conversion, an amplifier and an echo compensator.

Figure 2:
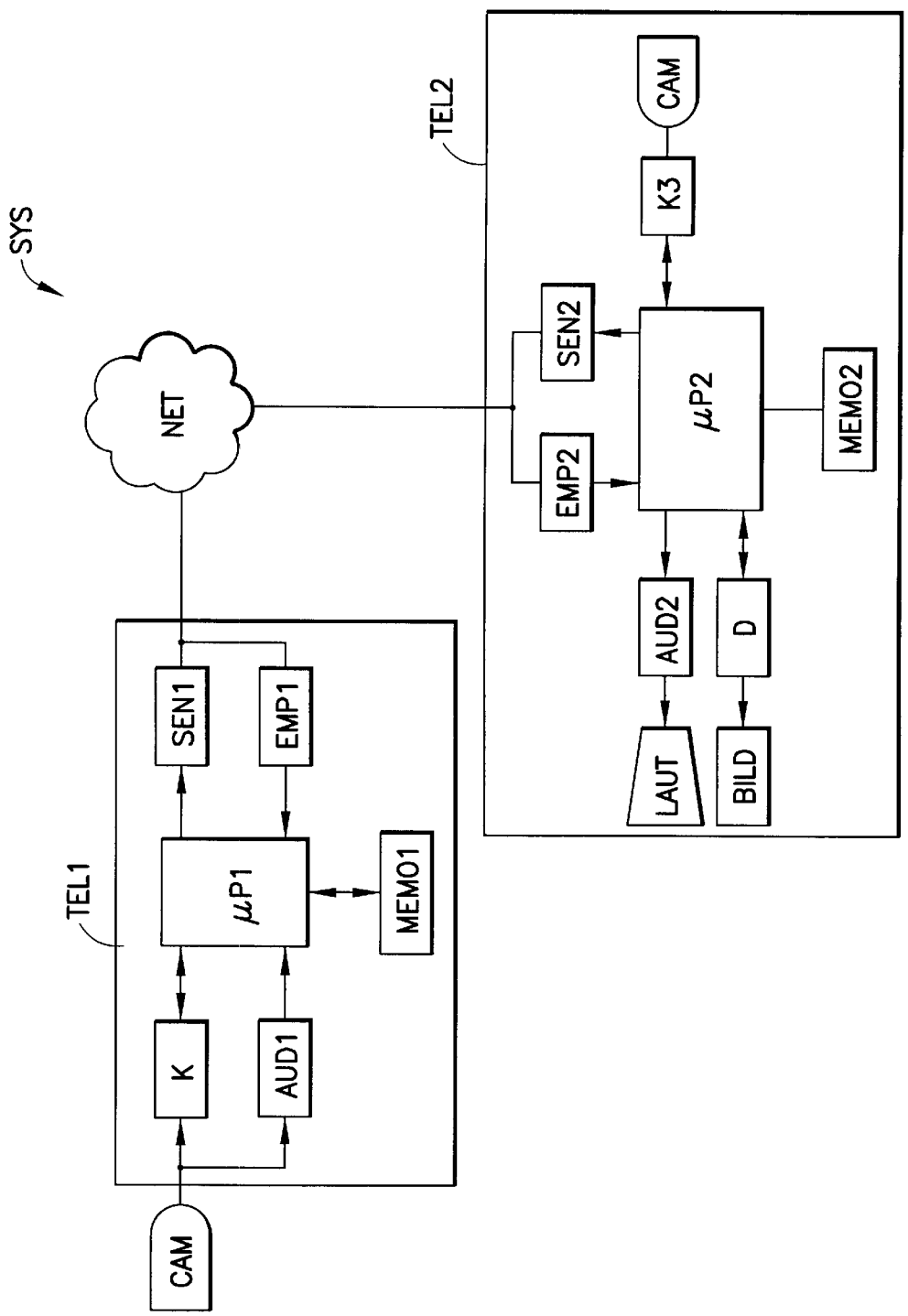

The encoding unit K comprises two encoders for each switched connection. The encoding unit K may comprise, for example, 100 encoders, of which two encoders K1, K2 are depicted in FIG. 2. The encoder K1 is used to encode video data from a sequence of video images. The sequence of video images is, for example, a live television transmission. In the encoder K1, video data are encoded according to an interframe method. The interframe method advantageously uses the correlation between sequential video images. The encoder K1 is controlled by the control unit CTRL and receives from a camera CAM with a microphone a live-recording of sequential video images, encodes these video images according to the interframe method and transmits those encoded images to the control unit CTRL. A respective encoder is known from, for example, DE 36 13 343 A1.

The encoder K2 is used to encode video data of selected frames. In the encoder K2, video data are encoded according to an intraframe method. The intraframe method advantageously uses the correlation of video data within a video image. A respective encoder is known from, for example, DE 36 13 343 A1. The attainable compression of the data rate is less for the intraframe method than for the interframe method. The encoder K2 is controlled by the control unit. The resolution which the encoder K2 uses for encoding, is selectable. The encoder K2 receives the same video data as the encoder K1. The encoder K2 is controlled by the control unit CTRL and encodes video data of individually selected video images and transmits those encoded data to the control unit CTRL. One of the selected video images is the initial video image of the sequence to be transmitted, which is also transmitted to the encoder K1, so that encoder K1 can start the interframe method.

The control unit CTRL is used to control the encoding unit K and the transmitting unit SEN as well as to execute an access control for the received request signals and to select the encoding method depending on the received request signals. For this purpose, the control unit CTRL comprises a microprocessor or a digital signal processor and a memory. The server SER can be dialed up from several video telephones simultaneously. In order to transmit the requested and selected video data simultaneously over several switched connections, the control unit further comprises several switching elements and a time multiplexer.

The server SER further comprises an audio unit AUD, a video recording unit REC, a CD-recording unit CD and a data processing unit AUF, each of which is connected to the control unit CTRL.

The audio unit AUD is used to encode the audio signals associated with a sequence of video images and to convey those encoded signals to the control unit CTRL. The transmission of the audio signals is performed independently of the encoding method and synchronized to the sequence of the video images. For this purpose, there is, for example, employed a switched connection having two channels carrying information, with the first information channel used for transmitting video data and the second information channel used for transmitting audio signals.

The video recording unit REC comprises a plurality of video recorders. Each video recorder is used to receive a video cassette with a selected video movie to be transmitted over a switched connection. Each video recorder is controlled by the control unit CTRL.

The CD-recording unit CD comprises a plurality of CD-recorders for playing Compact Disc Read Only Memories, also called CD-ROM. Each CD-recorder is controlled by the control unit CTRL, with the selected CD-ROM transmitted over a switched connection. On the video cassettes and the CD-ROM's, there are stored, for example, TV transmissions from the previous day or video clips.

The data processing unit AUF is connected to an antenna ANT and a transmission line, for example by an optical fiber cable or a coaxial cable, for receiving respective TV transmissions or video movies. The data processing unit AUF is controlled by the control unit CTRL and comprises amplifiers, an optical/electrical converter and an equalizing network, an encoding unit and an audio unit which correspond to the above described encoding unit K and the already described audio unit AUD, performing identical functions.

In the following, the transmission of video data and request signals between server SER and video telephone TEL2 will be described with reference to an example.

In a basic connection configuration, a subscriber with a video telephone TEL2 is provided with two information channels with 64 kbits/s per channel, which are called B-channels, and with a signalling channel with 16 kbits/s, also called D-channel, for transmitting and receiving information. The subscriber dials the number of the server SER. The switched connection is established via the D-channel. A menu is transmitted to the video telephone via the control unit CTRL. The subscriber sends request signals in the form of selection numbers corresponding to the suggestions in the menu to the server SER over the established switched connection. The control unit CTRL processes the request signals. The subscriber selection corresponds to, for example, a TV program which is recorded live by the camera CAM at the time of the call. The control unit CTRL first selects the encoder K2 for encoding the initial video image from the selected sequence of video images. The encoded initial video image is transmitted via the control unit CTRL and over the switched connection over a B-channel. Next, the control unit CTRL selects the encoder K1 for encoding all subsequent images and transmitting these images to the video telephone TEL2 of the subscriber. If during the transmission of the sequence of video images, the subscriber becomes interested in a specific video image, then the subscriber can request said selected image by way of another selection number for transmission at a time selected by the subscriber. The selection number is transmitted over the switched connection to the server SER in form of request signals. The control unit CTRL processes the request signals and subsequently controls the encoder K2 in such a way that the selected video image is encoded with higher resolution. The encoded selected video image requires a higher transmission bandwidth. However, since only 64 kbits/s are available, the selected video image is divided in the control unit into partial images for sequential transmission to the video telephone TEL2. Consequently, the image reconstruction in the video telephone TEL2 is slower. The subscriber, however, receives a video image with a higher image quality. As a result, a current separate frame from a sequence of video images is encoded and transmitted as a still image.

During the transmission of the selected video image, the audio signals are transmitted synchronously with the sequence of video images. In this way, the subscriber is able to follow the audio portion of the TV program while watching the still image. In the video telephone TEL2, the selected still image can now be stored in memory by using another selection number and can be printed by a facsimile equipment or photographed or, for example, used a press photo, the switched connection has been disconnected. By using again another selection number, the subscriber can return to the live TV program. The method therefor has been described above.

A second embodiment will now be discussed with reference to FIG. 2. FIG. 2 shows a transmission system SYS according to the invention. The transmission system SYS is an apparatus for transmitting video data, the apparatus formed as video telephone TEL1 and connected via an integrated services network NET, also called ISDN, to an apparatus formed as video telephone TEL2, for transmitting request signals. The video telephone TEL2 corresponds to the video telephone of FIG. 1.

For the sake of simplification, both video telephones TEL1, TEL2 are depicted without the usual components, such as echo compensator, keypad, receiver and display. From video telephone TEL2 and by using a request signal, a subscriber can select video data residing in video telephone TEL1 as well as associated encoding method. The selected video data are transmitted over a switched connection via the integrated services digital network NET to the video telephone TEL2.

The video telephone TEL1 comprises a control unit implemented as a microprocessor $\mu P1$, a transmitting unit SEN1, a receiving unit EMP1 and an encoding unit K.

The transmitting unit SEN1 is used to transmit selected video data into the integrated services digital network NET over a switched connection.

The receiving unit EMP1 is used to receive request signals from the integrated services digital network NET.

The encoding unit K is used to encode by two different encoding methods video data which are to be transmitted.

The two encoding methods are distinguished from each other in that video data can be encoded with different resolution. A sequence of video images is encoded with a lower resolution, requiring less bandwidth for transmission. Selected separate frames are encoded with a high resolution, requiring a large bandwidth for transmission. Switching between these two encoding methods is controlled by software through the microprocessor $\mu$P1 without interrupting the switched connection.

The microprocessor $\mu$P1 is used for controlling the encoding unit K and the transmitting unit SEN1 as well as for selecting the encoding method and the video data depending on the request signals. The microprocessor $\mu$P1 is connected to a memory MEMO1. In the memory MEMO1, there are stored the telephone numbers of the subscribers authorized to access the selection of video data in the video telephone TEL1. When the video telephone TEL1 is dialed up, then the microprocessor $\mu$P1 checks if the telephone number of the caller is stored in memory or not. If the telephone number is stored in memory and the subscriber therefore is authorized to have access, then the video data are selected and the selected video data are transmitted. If the telephone number is not stored in memory, i.e. the authorization fails, then the subscriber receives a telephone message that access is denied.

The video telephone TEL1 further comprises an audio unit AUD1. The audio unit AUD1 is used to encode the audio signals associated with a sequence of video images and to convey the encoded audio signals to the microprocessor $\mu$P1. The audio signals are transmitted independently of the encoding method and are synchronized to the sequence of the video images. For example, the sequence is transmitted over the B1-channel while the audio signals are transmitted over the B2-channel.

The encoding unit K and the audio unit AUD1 are connected to a camera CAM which records live, for example, a TV program.

The video telephone TEL2 is used to transmit request signals and to receive video data and is connected to the video telephone TEL1 via the integrated services digital network NET.

The video telephone TEL2 comprises a transmitting unit SEN2, a receiving unit EMP2, a control unit implemented as a microprocessor $\mu$P2 and a memory MEMO2, wherein all the above elements are similar to the corresponding elements of video telephone TEL 1. The microprocessor $\mu$P2 is connected to a display screen BILD via a decoding unit D and to a loudspeaker via an audio unit AUD2.

In the audio unit AUD2, the received signals are decoded and subsequently conveyed to the loudspeaker.

The received video data are decoded in the decoding unit D and subsequently displayed on the display screen. The decoding unit D is switchable by the microprocessor $\mu$P2 under software control. The received video data have to be decoded by the decoding unit D by the same method that was used for encoding the received video data. It is feasible to denote the encoding method by a bit in the header during transmission of the video data, or the decoding unit D is switched automatically for each transmitted selection number requesting a change in the encoding method.

The video data and request signals between video telephone TEL1 and video telephone TEL2 are transmitted in a similar manner as between the server and the video telephone of FIG. 1, thus making a more detailed discussion redundant.

The video telephone TEL2 further comprises an encoding unit K3 and a camera CAM integrated with the video telephone TEL2.

The encoding unit K3 is similar to the encoding unit K of the video telephone TEL1.

The encoder K2 which is controlled by the microprocessor $\mu$P2, is capable of encoding, for example, a separate image of the subscriber. This encoded separate frame is stored in memory MEMO2. During the video telephone call between the subscriber with the video telephone TEL2 and a partner with another video telephone, the subscriber can, for example, select if the stored image should be used or if the live images from the camera CAM should be transmitted as a sequence of video data. The subscriber may during the switched connection also switch between the separate frame and a sequence of images. The stored image may, for example, depict a circuit diagram which is the topic of a discussion, or the like. The switching operation does not affect the transmission of the audio signals via the audio unit AUD2.

In the embodiments, the encoding unit and the decoding unit can be switched between two encoding methods and two decoding methods, respectively. Instead of the encoding unit with two encoding methods, the invention can also be used with an encoding unit which can be switched between more than two, for example four, encoding methods. The first encoding method, for example, would encode video data in such a way that the data can only be transmitted over a 64 kbits/s line. The second encoding method, for example, would encode with twice the resolution, so that an encoded sequence of video images can be transmitted over a 128 kbits/s line. The third encoding method, for example, would encode with an even higher resolution, so that an encoded sequence of video images can be transmitted over a 2 Mbits/s line. In the forth encoding method, for example, separate frames would be encoded with a selectable resolution. The decoding unit is the counterpart of the encoding unit and is designed accordingly. Video telephones may also be designed with different decoding units. The decoding unit of a video telephone may, for example, be able to decode encoded video data transmitted over a 64 kbits/s line as well as encoded separate frames. The decoding unit of another video telephone may, conversely, be able to decode encoded video data transmitted over a 2 Mbits/s line. Both video telephones would access the same server. The encoding unit in the video telephones may also be different, like the decoding units. This makes it possible to have video telephones with different features.

In both embodiments, the encoding and decoding methods are selected by way of request signals entered by the subscriber on the keypad. Instead of entering the request signals manually via the keypad, the request signals may also be selected automatically, for example by a measuring unit in a video telephone which measures the transmission quality, deriving therefrom an appropriate encoding or decoding method, or by a unit for determining the available transmission bandwidth and establishing the suitable encoding method therefrom. This provides an additional feature for video telephones.

What is claimed is:

1. An apparatus (SER, TEL1) for transmitting video data over an integrated services digital network (NET), said apparatus comprising a video/audio receiving unit (TEL2), a transmitting unit (SEN, SEN1) for transmitting video data over a switched connection to said video/audio receiving unit (TEL2) over said network (NET), a receiving unit (EMP) for receiving request signals from said video/audio receiving unit (TEL2), an encoding unit (K) for encoding the video data using at least two different encoding methods, and a control unit (CTRL, $\mu$P1) cooperatively engaged with the encoding unit (K), wherein the encoding methods are selectable with the control unit (CTRL, μP1) in accordance with information in the received request signals from said video/audio receiving unit (TEL2) through said receiving unit (EMP) so as to allow a subscriber to select the type of encoding method and the time of encoding, and wherein the encoding unit (K) comprises a first encoder (KI) for encoding video data of an image sequence and a second encoder (K2) for encoding video data of selected frames;

the encoding method is switchable between the two encoders (K1, K2) under software control by the control unit (CTRL, μP1) without opening the switched connection; and the transmitting unit (SEN, SEN1) serves to transmit audio signals, and that the transmission of the audio signals is synchronous with the image sequence independently of the encoding method used.

\* \* \* \* \*